(12) United States Patent
Regazzi et al.

(10) Patent No.: US 7,528,584 B2
(45) Date of Patent: May 5, 2009

(54) POWER MOS VOLTAGE REGULATOR FOR BATTERIES

(75) Inventors: Gianni Regazzi, Bologna (IT); Beniamino Baldoni, Bologna (IT)

(73) Assignee: Ducati Energia S.p.A., Bologna (IT)

( * ) Notice: Subject to any disclaimer, the term of this patent is extended or adjusted under 35 U.S.C. 154(b) by 270 days.

(21) Appl. No.: 11/110,673

(22) Filed: Apr. 21, 2005

(65) Prior Publication Data

US 2005/0258892 A1    Nov. 24, 2005

(30) Foreign Application Priority Data

May 24, 2004    (IT)    .............................. MI04A1026

(51) Int. Cl.
  *H02J 7/14*   (2006.01)
  *H02J 7/00*   (2006.01)
  *H02P 11/00*  (2006.01)
  *H02H 7/06*   (2006.01)
  *H02P 9/00*   (2006.01)

(52) U.S. Cl. .......................... 322/28; 320/104; 320/108; 320/109

(58) Field of Classification Search ................ 320/104, 320/108, 109; 322/28
See application file for complete search history.

(56) References Cited

U.S. PATENT DOCUMENTS

| 4,431,959 | A |   | 2/1984  | Remmers |
|-----------|---|---|---------|---------|
| 5,714,871 | A |   | 2/1998  | Endou   |
| 5,780,996 | A | * | 7/1998  | Kusase et al. .................. 322/28 |
| 5,982,154 | A | * | 11/1999 | Kanazawa et al. ............ 322/29 |
| 6,362,603 | B2| * | 3/2002  | Suzuki et al. ................ 320/163 |

FOREIGN PATENT DOCUMENTS

EP    0 936 720    8/1999

* cited by examiner

*Primary Examiner*—Akm E Ullah
*Assistant Examiner*—Jue Zhang
(74) *Attorney, Agent, or Firm*—Young & Thompson

(57) ABSTRACT

A power MOS voltage regulator for recharging batteries of motor vehicles; a voltage generator is selectively connected to a battery, respectively to an earth by a controlled rectifier bridge. The rectifier bridge includes a Schottky diode connected between each phase winding of the generator and the positive terminal of the battery, and a power MOS transistor branched between the phase winding and the earth; a control electrode of the power MOS transistor is driven by a control circuit for controlling the charging state of the battery, to enable the changeover of the power MOS transistor between a conductive state and a non conductive state, and vice versa, when the voltage of the phase winding is zero.

6 Claims, 3 Drawing Sheets

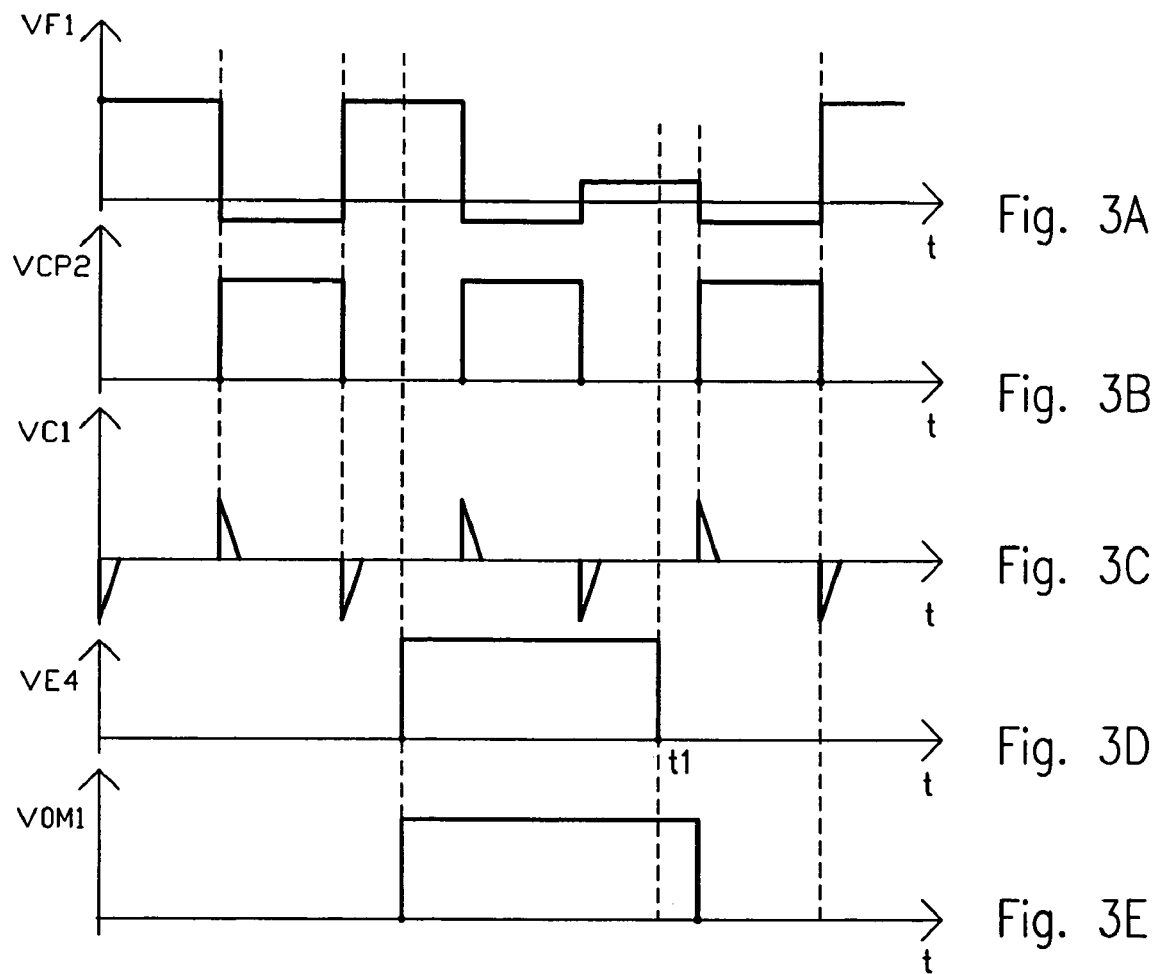

POWER MOS VOLTAGE REGULATOR FOR BATTERIES

BACKGROUND OF THE INVENTION

This invention refers to an automatic system for charging batteries, and in particular is directed to a voltage regulator of a battery charging system normally used for powering motor vehicles, such a motorcycles and the like.

STATE OF THE ART

A system for charging the battery of a vehicle, normally comprises a voltage magneto generator operatively connected to the engine of the vehicle, which can be selectively connected to an electrical battery of the vehicle by means of a controlled diode bridge, and to the earth by means of electronic switches driven by a control unit preset to detect the charging state of the battery. A general diagram of a per se known system for charging batteries is shown in FIG. 1 of the accompanying drawings.

An automatic battery charging systems for motor vehicles, usually comprises a voltage magneto generator, and a voltage regulator of three-phase and parallel type, in that the use of standard voltage regulators of series type gives rise to excessively high output voltages at high running of the engine.

Therefore, this invention is directed to a battery charging system for motor vehicles, which make use of a voltage regulator of parallel type, with particular reference to a three-phase regulator currently in use when the power required by the motor vehicle exceed 200 W.

As shown in FIG. 1, a well-known system for charging the battery of a motor vehicle, usually comprises a voltage magneto generator 10, having phase windings A, B and C connected to a positive terminal of a battery BA by means of a controlled diode bridge 11, substantially comprising the directly biased diodes D1, D2, D3 having the cathode connected to the positive terminal of the battery BA, and branched-off or reversely biased diodes D4, D5 and D6 whose anode is connected to earth.

The phase windings A, B and C of the magneto generator 10, are in turn selectively connectable to the earth by means of respective electronic switches, consisting for example of the SCR Q1, Q2 and Q3 whose control electrode is connected to a control unit 12 to be driven in relation to a voltage value or a charge state of the battery BA.

This solution, although being simple, nevertheless involves excessive power dissipation when the currents flowing in the phase windings of the generator 10 become high. For example, a voltage regulator having an output current of 30A, dissipates approximately 60 W in the power components, since the voltage drop in each SCR diode is approximately 1 V. This fact also implies the need to use somewhat cumbersome finned power dissipaters.

In order to improve the situation, it has also been suggested to use a regulator of parallel-type comprising Schottky diodes and power MOS transistors.

By means of this second solution it is possible to reduce the power dissipation in that a power MOS transistor, for voltages lower than 60 V, in a TO 220 container has a resistance of approximately 5 ohm, while a Schottky diode has a voltage drop of only 0.6 V. The dissipated power can be estimated as being between 20, and 30 W depending upon the ON or OFF conditions of the electric loads connected to the battery.

These voltage regulators however have a number of drawbacks that this invention aims to remedy.

One of the functional differences existing between an SCR controlled diode and a power MOS transistor, is that the latter can be switched both in ON and in OFF state, while the SCR controlled diode does not switch off until the current has dropped to zero; this fact implies that in a power MOS regulator the latter can be switched ON and OFF regardless of the currents flowing in the components, which on the contrary does not occur with SCR regulators in which the ON state can be actuated at any time in relation to the charge degree of the battery, while the OFF state occurs only when the current reaches zero valve.

During the time in which the power MOS transistors are OFF, the current flows exclusively between the phase windings of the generator and the power MOS, not affecting the battery, and consequently preventing the charging of the same battery. When the control unit which controls the voltage of the battery detects that said voltage is dropped below a pre-established rated value, then the power MOS must be switched OFF; if this is done regardless of circulation of the currents in the phase windings of the generator, it can give rise to current peaks with very steep fronts through the charging diodes, the cables and the battery, with consequent voltage peaks due to the inductances of the generator and the same cables, negatively effecting the electronic equipments of the vehicle.

The same applies as far as the ON switching of the power MOS is concerned.

OBJECT OF THE INVENTION

The main object of this invention is to remedy these problems in order to reduce the power dissipation of the voltage regulator, and prevent the formation of high current peaks and the consequent circuit noises.

BRIEF DESCRIPTION OF THE INVENTION

According to the invention, a voltage regulator has been provided in an automatic voltage charging system for a battery including an AC magneto generator having at least one phase winding selectively connectable to the battery and to earth, said voltage regulator comprising:

a rectifier bridge having a Schottky diode connected between the phase winding of the magneto generator and the battery, and a power MOS transistor branched-off between the phase winding and an earth terminal; and an electronic control unit connected to a control electrode of the power MOS transistor to drive the latter between ON and OFF states, said control unit being conformed and preset to detect the phase voltage of the magneto generator, respectively to detect the voltage of the battery, and to trigger the power MOS transistor between the ON and OFF states when the detected phase voltage of the magneto generator is passing through zero.

In particular, according to the invention, during each charging step of the battery, the power MOS transistor is maintained in a conductive or ON state when the voltage between the Drain and the Source of the power MOS is negative, and in a OFF state when the voltage between the Drain and the Source of the power MOS is positive, whereas if the voltage of the battery is higher than its rated charging value, the power MOS transistor is maintained constantly in its ON state to short-circuiting the relevant phase of the magneto generator towards earth, while any change between the ON and OFF states of the power MOS transistor always occurs when the phase voltage of the same magneto generator, with respect to earth, or the voltage between the Drain and Source electrodes of the power MOS transistor passes through zero.

BRIEF DESCRIPTION OF THE DRAWINGS

These and further features of a voltage regulator and a system for charging batteries according to this invention, will be more clearly evident from the following description, with reference to the accompanying drawings, in which:

FIGS. 3A to 3E show some voltage graphs of the voltage regulator of FIG. 2.

DETAILED DESCRIPTION OF THE INVENTION

Figure 1:
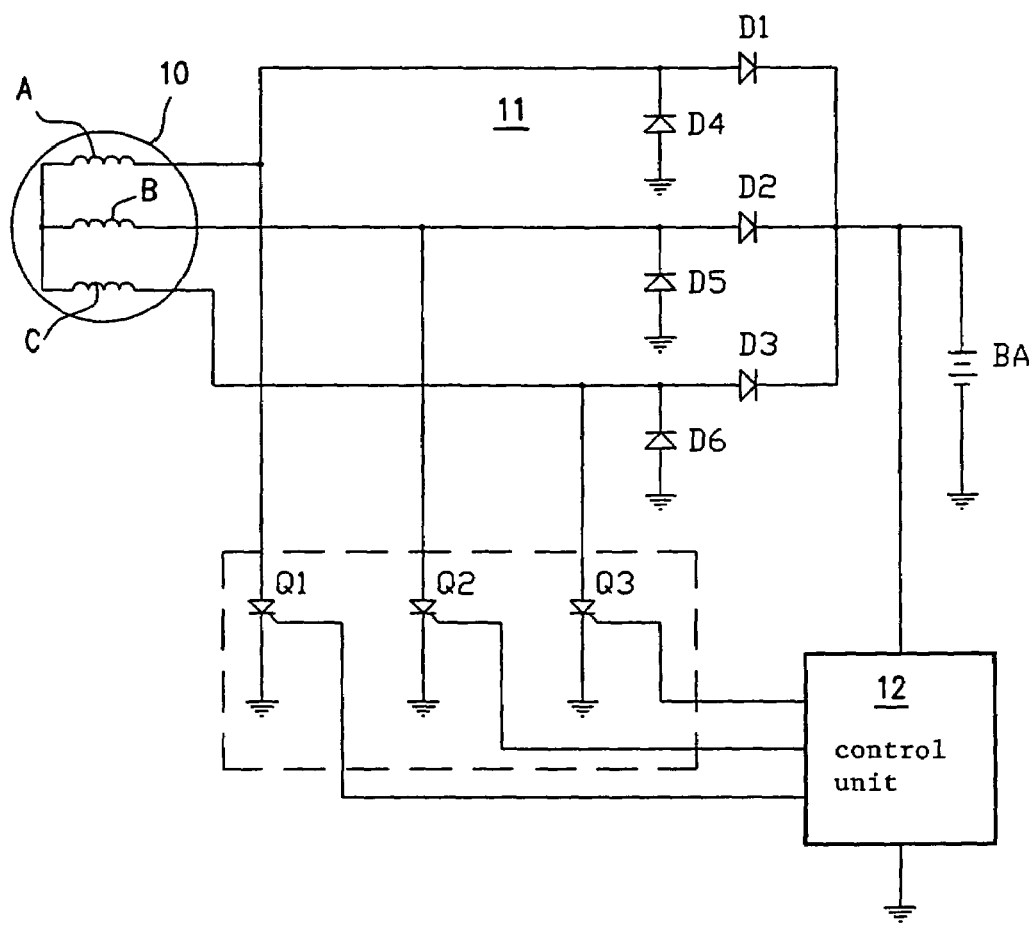
FIG. 1 shows the diagram of a per se known battery charging system.
Figure 2:
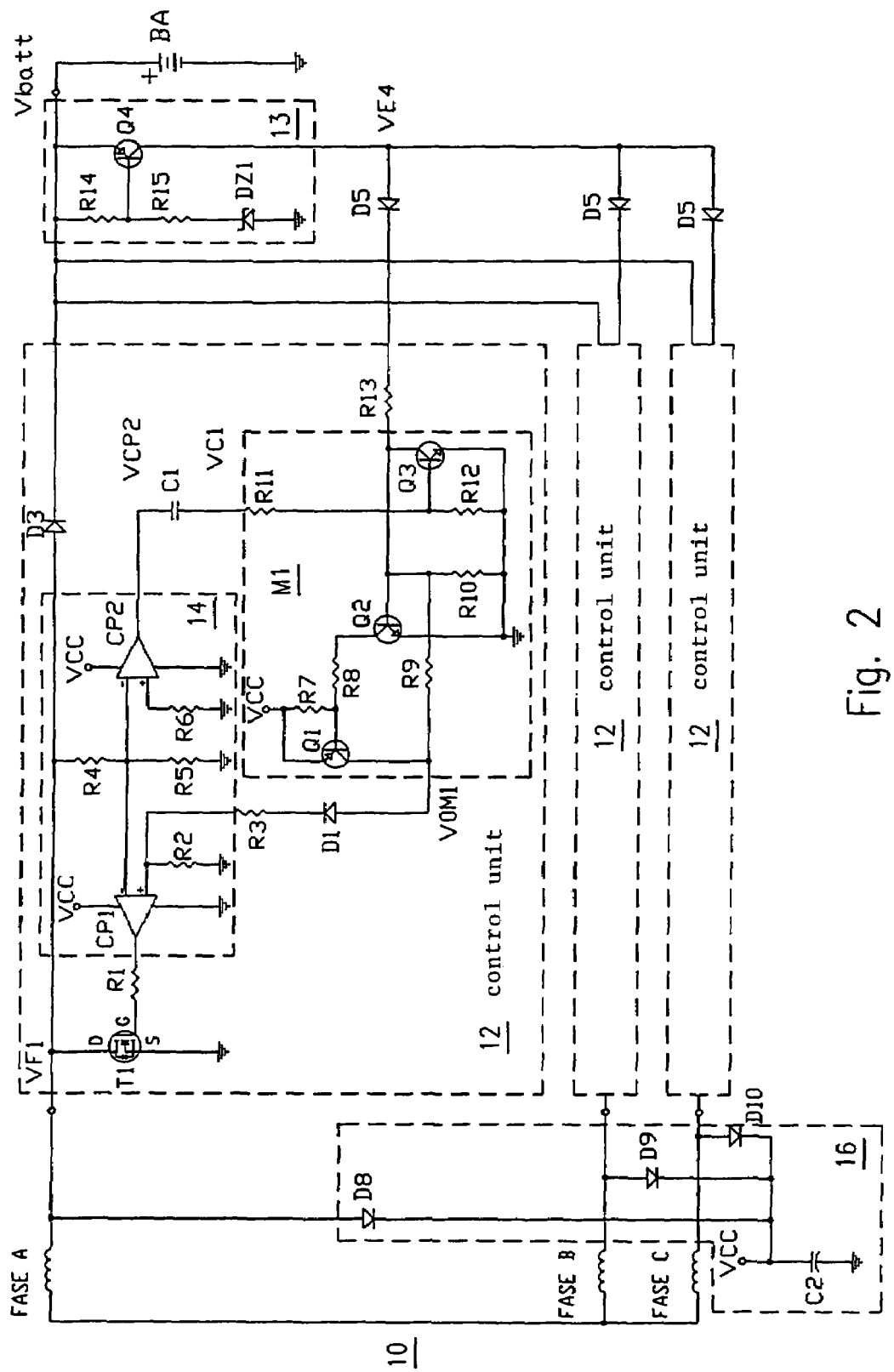
FIG. 2 shows the diagram of an electronic voltage regulator and a battery charging system according to the invention.

FIG. 1 shows the general diagram of a system for charging a battery of a known type, as previously described, while FIG. 2 shows a battery charging system comprising a voltage regulator according to the invention, for a three-phase AC magneto generator; however, the invention can be applied to any type of single-phase and multi-phase voltage generator, depending upon the circumstances.

For ease of description, reference will be made to a single phase of a three-phase voltage generator 10, for example to the phase winding A, in that the proposed electronic solution should be understood as repeated for the remaining phase windings B and C, in the three-phase system of FIG. 2.

As shown in FIG. 2, each of the phase windings A, B and C of the AC voltage magneto generator 10, is connected to the positive terminal (+) of the battery BA, by means of a rectifier bridge comprising, a directly biased diode D3, such as a "Schottky" diode, having a low conductive resistance and a low voltage drop. The anode of the Schottky diode D3, as shown, is connected to the phase winding A of the voltage generator 10, while its cathode is connected to the positive terminal (+) of the battery BA.

The rectifier bridge also comprises, for each phase of the voltage generator 10, a power MOS transistor T1, which is branched-off between the phase winding A and the earth; more particularly, the Drain electrode D of T1, is connected to the phase winding A, as per the anode of diode D3, while its Source electrode S is connected to the earth of the circuit.

In the same FIG. 2 it can also be seen that the control or Gate electrode G of the transistor T1 is connected to the outlet side of an electronic control unit 12, the inlet side of which in turn is connected, by means of diode D5, to a first voltage detecting circuit 13; the circuit 13 detects the high and low states of the charging voltage Vbatt of the battery BA, in relation to which the control unit 12 drives the power MOS transistor T1 between its ON and OFF states.

The control unit 12 comprises a memory M1 for memorizing a high and a low state of-the voltage of the battery BA, to be compared to a rated voltage value; the inlet of the memory M1 is connected to the voltage detecting circuit 13 by means of a resistor R13 and the diode D5.

A first outlet VOM1 of the memory M1 is in turn connected to a second voltage detecting circuit 14 for detecting the alternating voltage VF1 of the phase winding A of the voltage generator 10.

More in particular, according to a possible embodiment, the memory M1 comprises two electronic switches Q1 and Q2, consisting of a PNP and respectively a NPN transistor; the collector-emitter circuit of Q1 is directly connected to the voltage outlet VCC of a feeding circuit 16, while the control base of Q1 is connected to a voltage divider provided by the resistors R7 and R8 in the emitter-collector circuit of Q2. The control base of Q2 is in turn connected to a voltage divider provided by the resistors R9, R10, and is connected to a reset circuit for resetting the memory M1, comprising an electronic switch Q3 such as a NPN transistor, whose base is polarized by a resistor R12.

The emitter-collector circuit of Q1, by means of the outlet VOM1 of the memory M1, is also connected to the AC voltage detecting circuit 14 for controlling the voltage VF1 of the phase winding A.

The AC voltage detecting circuit 14 comprises a first voltage comparator CP1 whose outlet is connected to the Gate or control electrode of the power MOS T1 by means of the resistor R1.

The circuit 14 also comprises a second voltage comparator CP2 whose outlet is connected, by means of the capacitor C1, to a voltage divider of the memory M1, provided by the resistors R11 and R12.

The non-inverting inlet (+) of the first voltage comparator CP1 is connected, by means of the resistor R3 and the diode D1 to the outlet VOM1 of the memory circuit M1, and to earth by means of the resistor R2.

Lastly, in the same FIG. 2 it can be seen that the inverting inlet (−) of both voltage comparators CP1 and CP2, are connected, by means of a voltage divider R4, R5 to the phase winding A.

Reference 16 in FIG. 2 has been used to indicate a DC feeding circuit for the system, connected between the phase windings A, B, C of the voltage generator 10 and earth, by means of the diodes D8, D9 and D10 and the capacitor C2, to supply a feeding voltage VCC to the components, substantially corresponding to the battery voltage Vbatt.

Lastly, the voltage detecting circuit 13, for detecting the charge degree of the battery BA, comprises a PNP transistor Q4 whose emitter-collector circuit is connected to the inlet side of the memory M1 by means of the diode D5 and the resistor R13, while the base of Q4 is connected to a voltage divider R14, R15 comprising a Zener diode DZ1.

The voltage regulator operates as follows.

Let us consider the step in which the battery BA must be charged because its voltage value is lower than a desired threshold or rated voltage: typically 14.5 Volt.

As can be seen from FIG. 2, the comparator CP1 detects the passage through zero of the voltage of phase winding A; in particular the outlet of the comparator CP1 connected to Gate G of T1, switches low bringing the power MOS T1 into an OFF state when the voltage of phase A is positive with respect to earth; therefore the Schottky diode D3 will be biased directly and the current coming from phase winding A of the generator can charge the battery BA.

When the voltage of phase A of the generator 10 is negative with respect to earth, the outlet of the comparator CP1 connected to Gate G of T1, switches high bringing the power MOS T1 into an ON state; therefore the current can flow from earth, through the power MOS T1, towards phase winding A of the generator.

If during this time the Gate G of T1 remains low, the current from earth can go to phase winding A of the generator through the diode inside the power MOS, which has its anode connected to the Source and its cathode to the Drain; however, in this way the voltage drop and therefore the power dissipation are greater.

A power MOS diode with a resistance of 5 milli-Ohms, with a breakdown voltage of 60 Volts and a current of 30 Amp, has a voltage drop of 0.15 Volts, while in the event the diode is in a conductive state, the voltage drop of the diode is at least 0.7 Volts, thereby proving the importance of bringing the power MOS T1 into an ON state when the phase voltage is negative.

The system is also provided with a second voltage comparator CP2 having its inverting inlet (−) in common with the inverting inlet (−) of CP1, both being connected, by means of the voltage divider R4, R5, to phase winding A of the generator 10; the non-inverting inlet (+) of CP2 is connected to earth by means of the resistor R6. The voltage comparator CP2 reads the voltage drop at the terminals of the power MOS T1 and provides a square wave output signal VF1 (FIG. 3A) which is reversed with respect to the voltage signal of the relevant phase winding A of the generator 10.

If the battery voltage Vbatt is lower than the voltage of the Zener diode DZ1, then no current flows through the voltage divider R14, R15 and the PNP transistor Q4 cannot enter into an ON state. As a result, neither the transistors Q1, Q2 can enter into their ON state; consequently the diode D1 is interdicted or in an OFF state and the non-inverting inlet (+) of CP1 is referred to earth by means of the resistor R2. Since the inverting inlet of CP1 is in common with the inverting inlet (−) of CP2, during this step the comparator CP1 behaves like CP2 thus being able to drive T1 in an OFF state when phase voltage of winding A of the generator is positive with respect to earth, and drive T1 in an ON state when phase voltage of winding A of the generator is negative with respect to earth.

During the positive fronts of the output voltage VCP2 (FIG. 3B) of the comparator CP2, by means of the capacitor C1 and the voltage divider R11, R12, Q3 enters into an ON state for a very short time, typically 10 microseconds determined by the capacity value of the capacitor C1, and by the resistor R11, but since the transistor Q2 is already in an OFF state, as Q1, the state of the transistor Q3 has no effect on the state of the memory M1; the capacitor C1 will later be discharged during the negative fronts at the outlet of CP2 (VC1 FIG. 3C).

The assembly comprising the transistor Q1 and the transistor Q2 with the resistors R7, R8; R9, R10 connected as shown in FIG. 2, constitutes a memory circuit for the high and low states of the battery voltage Vbatt, with respect to its rated value.

The outlet of the aforesaid memory has a voltage VOM1 applied to the anode of D1, which is null if Q1 and Q2 are in an OFF state, and at a voltage value equivalent to VCC if Q1, Q2 are in an ON state, as shown in FIG. 3E.

Q1 is brought into the ON state when Q2 is in a conductive or ON state, the latter in turn being activated by the positive biasing of its base generated by a current entering the base of Q2 through D5 and R13, when Q4 is ON.

Since there is a positive reaction of the outlet on the inlet through R9, if Q1 and Q2 are ON, they will remain so regardless of the state of Q4; Q1, Q2 will go back to the OFF state only when Q3 is brought ON, thereby giving rise to the resetting of the memory M1.

In practice, the outlet VOM1 of the memory M1 can switch from the logic state 1 to the logic state 0 only in correspondence with the leading front of the output of the comparator CP2 (FIG. 3B) which, by means of C1 and R11 bring Q3 into the ON state, and can switch from the logic state 0 to 1 only with a positive signal on the base of Q2 generated by Q4 through D5, R13.

If the battery voltage exceeds the voltage of the Zener DZ1, which indicates that the battery BA has reached the full load voltage, the current begins to flow through the voltage divider R14, R15 biasing the base of the transistor Q4 until it begins to conduct, bringing the voltage VE4 (FIG. 3D) on the anode of the diode D5, up to the battery voltage Vbatt; being biased directly, the diode D5 conducts and sets the memory M1 of winding A, and at the same those of the other phases winding B and C, at the logic state 1.

The output voltage VOM1 of the memory M1, relating to the logic state 1, corresponds to VCC which is equal to the battery voltage Vbatt, which is also equal to the phase voltage VF1, less the voltage drop of the Schottky diode D3 (typically 0.5 Volt), when the latter is ON or in a conductive state.

If, as shown in FIG. 3, the voltage VE4 switches from 0 to Vbatt in correspondence with the high phase voltage VF1, that is to say while phase winding A is loading the battery BA, the outlet VOM1 of the memory M1 switches from the logic state 1 corresponding to the voltage VCC, which is divided by the resistive voltage divider R3, R2 and applied to the non-inverting inlet of CP1, while the voltage VF1 divided by the resistive potential divider R4, R5 is present at the inverting input.

If the resistive values are chosen in such a way that R3/R2>R4/R5, for example R3=3R2 and R4=R5, then during the time in which the phase voltage VF1 is high, that is to say it is at a voltage of approximately 0.5 Volts higher than that of the battery, the inverting inlet of CP1 still exceeds the non-inverting inlet, whose outlet remains low, preventing T1 from entering into conduction, while the Schottky diode D3 is ON. In this way it is possible to avoid the problems of voltage peaks due to the rapid change of current in the diodes and in the connecting cables.

This is due to the fact that the current flowing from the voltage regulator 12, towards the battery BA, has a sinusoidal pattern imposed by the alternating voltage of the generator 10, and not by the switchover of the electronic switches.

When the voltage VF1 changes from positive to negative, the outlet of CP1 is still high and T1 is still ON or in a conductive state, while the outlet of the comparator CP2 switches from low to high and, by means of the capacitor C1 and the resistor R11, brings the transistor Q3 into the ON state for a few microseconds sufficient to bring the outlet VOM1 of the memory M1 to the logic state 0.

The voltage VF1 is negative with respect to earth by a few tenths of a Volt determined by the voltage drop generated by the current which flows through the power MOS T1, from earth towards phase winding A.

If the voltage VE4 remains high, which indicates that the battery BA is loaded, then the outlet of the memory M1 is once again brought into the logic state 1 corresponding to a voltage VOM1=VCC subsequently applied, by means of the diode D1 and the voltage divider R3, R2, to the non-inverting inlet (+) of the comparator CP1, which inlet will be to a voltage value equivalent to a fraction of VCC.

When the voltage VF1 changes from negative to positive then, since T1 is in the ON state, the voltage applied to the inverting inlet (−) of CP1 is lower than the voltage applied to the non-inverting inlet (+) and therefore the outlet of CP1 remains high with T1 in the ON state.

When the voltage VE4 drops to zero, indicating that the battery is exhausted, and assuming as in FIG. 3D that this occurs at the time t1 at which VF1 is positive, the state of the memory M1 does not change, that is to say, VOM1 remains high until the voltage VF1 passes through zero value, from positive to negative in correspondence with the leading front of VCP2.

In this way it is possible to avoid having rapid current changes in the connecting cables between the voltage regulator and the battery and in the Schottky diodes, due to the rapid switchovers of the power MOS T1, for the reasons mentioned previously.

In practice, the power MOS T1 changes state, that is to say, it passes from ON to OFF state, and vice versa, only in correspondence with the passage through zero of the voltage VF1, which also corresponds to current null in that the system described detects the voltage drop on T1, with respect to earth.

Obviously, what has been described for the phase winding A applies to all the other phase winding of a multiphase generator-voltage regulator system.

From what has been described and shown in the accompanying drawings, it will be clear that a power MOS voltage regulator for charging the batteries of motor vehicles, or for other purpose, and a system for automatically charging batteries comprising a similar voltage regulator, has been provided, whereby it is possible to achieve the desired results.

It is understood however that other modifications or changes may be made to the various components of the voltage regulator, and the entire battery charging system, without deviating from the scope of the appended claims.

What we claim is

1. A voltage regulator in an automatic voltage charging system for a battery including an AC magneto generator having a three phase winding in which each phase winding is connectable to the battery and to earth, said voltage regulator comprising:
    a rectifier Schottky diode connected between each phase winding of the magneto generator and the battery and a power MOS transistor branched-off between each phase winding and an earth terminal; and
    voltage control means comprising an electronic control unit for each phase winding connected to a control electrode of a respective power MOS transistor to drive the latter between ON and OFF states,
    each control unit being conformed and preset to detect a phase voltage of the magneto generator, respectively to detect the voltage of the battery, and to switch the power MOS transistor between the ON and OFF states when the detected phase voltage of the magneto generator is passing through zero,
    wherein all the power MOS transistors are maintained in an ON state when the battery voltage detected by the control units is higher than a rated charging value of the same battery.

2. The voltage regulator according to claim 1, in which the power MOS transistor comprises a Drain electrode connected to the phase winding of the magneto generator, and a Source electrode connected to earth, wherein, during a charging step of the battery, the power MOS transistor is maintained in an ON state when the voltage between the Drain and Source electrodes of the power MOS transistor is negative, while it is maintained in an OFF state when the voltage between the Drain and Source electrodes is positive.

3. A system for automatically charging a battery of a motor vehicle comprising:
    a magneto generator having a three phase winding for generating a charge voltage for the battery;
    voltage control means comprising an electronic control unit for each phase winding including a rectifier Schottky diode connected between the phase winding and a positive terminal of the battery, and a power MOS transistor having a control electrode, and a Drain-Source circuit connected between the phase winding of the magneto generator and an earth terminal;
    the electronic control unit being conformed to drive the power MOS transistor between an ON and an OFF State;
    a battery voltage detecting circuit connected between the positive terminal of the battery and a battery voltage memory circuit in each control unit for detecting and comparing the voltage of a charge state of the battery, with respect to a rated charging voltage;
    a memory circuit in each control unit for memorizing the detected voltage of the battery, said memory circuit having an inlet side connected to said battery voltage detecting circuit; and
    a phase voltage detecting circuit in each control unit for detecting the voltage of the phase windings of the magneto generator, said phase voltage detecting circuit being connected between an outlet side of the memory circuit and the control electrode of the power MOS transistor;
    wherein said memory circuit and said phase voltage detecting circuit of the control units being conformed and preset to trigger the power MOS transistor between ON and OFF states, when the phase winding voltage, detected by said phase voltage detecting circuits, passes through zero value, and
    wherein all the power MOS transistors of the control units are maintained in an ON state when the battery voltage detected by the control units, is higher than the rated charging value of the same battery.

4. The system according to claim 3, characterised in that said second voltage detecting circuit, comprises first and second voltage comparators having their inverting inlets connected to a same voltage divider branched from a phase winding of the magneto generator, and their non-inverting inlets connected to earth;
    the non-inverting inlet of the first voltage comparator being also connected to the outlet side of the memory circuit;
    the outlet of the first voltage comparator being connected to the control electrode of the power MOS transistor, while the outlet of the second voltage comparator is connected to a resetting circuit for the memory circuit.

5. The system according to claim 3, characterised in that the second voltage detecting circuit is conformed and preset such that during a charging step of the battery, the power MOS transistor is maintained in an ON state when the detected voltage between the Drain and the Source electrodes of the power MOS transistor is negative, while is maintained in an OFF state when said voltage detected by said second voltage detecting circuit is positive.

6. The system according to claim 5, characterised in that the power MOS transistor is maintained in its conductive state when the charge voltage of the battery, detected by said first voltage detecting circuit, has a value higher than the rated charge voltage of the same battery.

* * * * *